US011404745B2

(12) United States Patent
Guillonnet et al.

(10) Patent No.: US 11,404,745 B2
(45) Date of Patent: Aug. 2, 2022

(54) SEPARATOR FOR BATTERIES

(71) Applicant: AZA HOLDING PTE. LTD., Singapore (SG)

(72) Inventors: Didier Guillonnet, Paris (FR); Suren Martirosyan, Yerevan (AM)

(73) Assignee: AZA HOLDING PTE. LTD., Singapore (SG)

( * ) Notice: Subject to any disclaimer, the term of this patent is extended or adjusted under 35 U.S.C. 154(b) by 275 days.

(21) Appl. No.: 16/683,016

(22) Filed: Nov. 13, 2019

(65) Prior Publication Data

US 2020/0083504 A1   Mar. 12, 2020

Related U.S. Application Data

(63) Continuation of application No. 15/122,800, filed as application No. PCT/IB2015/051471 on Feb. 27, 2015, now Pat. No. 10,511,003.

(Continued)

(51) Int. Cl.
| | |
|---|---|
| *H01M 50/403* | (2021.01) |
| *H01M 10/30* | (2006.01) |
| *H01M 10/32* | (2006.01) |
| *H01M 10/24* | (2006.01) |
| *H01M 10/34* | (2006.01) |
| *H01M 50/40* | (2021.01) |
| *H01M 50/446* | (2021.01) |
| *H01M 10/42* | (2006.01) |
| *H01M 12/08* | (2006.01) |

(52) U.S. Cl.
CPC ......... *H01M 50/403* (2021.01); *H01M 10/24* (2013.01); *H01M 10/30* (2013.01); *H01M 10/32* (2013.01); *H01M 10/34* (2013.01); *H01M 10/4235* (2013.01); *H01M 12/08* (2013.01); *H01M 50/40* (2021.01); *H01M 50/446* (2021.01); *H01M 2220/20* (2013.01)

(58) Field of Classification Search
CPC ...... H01M 10/24; H01M 10/30; H01M 10/32; H01M 10/34; H01M 10/4235; H01M 12/08; H01M 50/40; H01M 50/403; H01M 50/446; H01M 2220/20; Y02E 60/10
See application file for complete search history.

(56) References Cited

U.S. PATENT DOCUMENTS

| | | | |
|---|---|---|---|
| 3,539,396 | A | 11/1970 | Wagner |
| 4,145,482 | A | 3/1979 | Von Benda |

(Continued)

FOREIGN PATENT DOCUMENTS

| | | |
|---|---|---|
| CN | 101820055 A | 9/2010 |
| FR | 2020314 A1 | 7/1970 |

(Continued)

OTHER PUBLICATIONS

International Search Report, dated Aug. 7, 2015, from corresponding PCT Application No. PCT/IB2015/051471 (cited in the parent application).

(Continued)

*Primary Examiner* — Brittany L Raymond
(74) *Attorney, Agent, or Firm* — Nixon & Vanderhye

(57) ABSTRACT

A separator which is permeable to hydroxide ion, and which contains at least one Dendrite Stopping Substance such as $Ni(OH)_2$, or its precursor.

9 Claims, 1 Drawing Sheet

Related U.S. Application Data

(60) Provisional application No. 61/947,327, filed on Mar. 3, 2014.

(56) References Cited

U.S. PATENT DOCUMENTS

| | | |
|---|---|---|
| 2005/0079424 A1 | 4/2005 | Davis et al. |
| 2011/0229930 A1 | 9/2011 | Menashe |
| 2012/0282520 A1* | 11/2012 | Martirosyan ......... H01M 4/244 |
| | | 429/206 |
| 2013/0165957 A1 | 6/2013 | Ciardelli et al. |
| 2013/0287655 A1 | 10/2013 | Hamad et al. |
| 2014/0227616 A1* | 8/2014 | Yamada ................ H01M 12/08 |
| | | 429/406 |
| 2015/0177183 A1 | 6/2015 | Bakker et al. |

FOREIGN PATENT DOCUMENTS

| | | | |
|---|---|---|---|
| WO | 2010118442 A1 | | 10/2010 |
| WO | WO 2013-073292 | * | 5/2013 |
| WO | 2013/110097 A1 | | 8/2013 |

OTHER PUBLICATIONS

Chemical Abstract (Accession No. 2010:1103550)—English abstract for CN 101820055 (Year: 2010) (cited in the parent application).
Google English translation for CN 101820055—machine-assisted English translation provided by Google. (Year: 2010) (cited in the parent application).
Machine-assisted English translation for FR 2020314 (Year: 1970) (cited in the parent application).

* cited by examiner

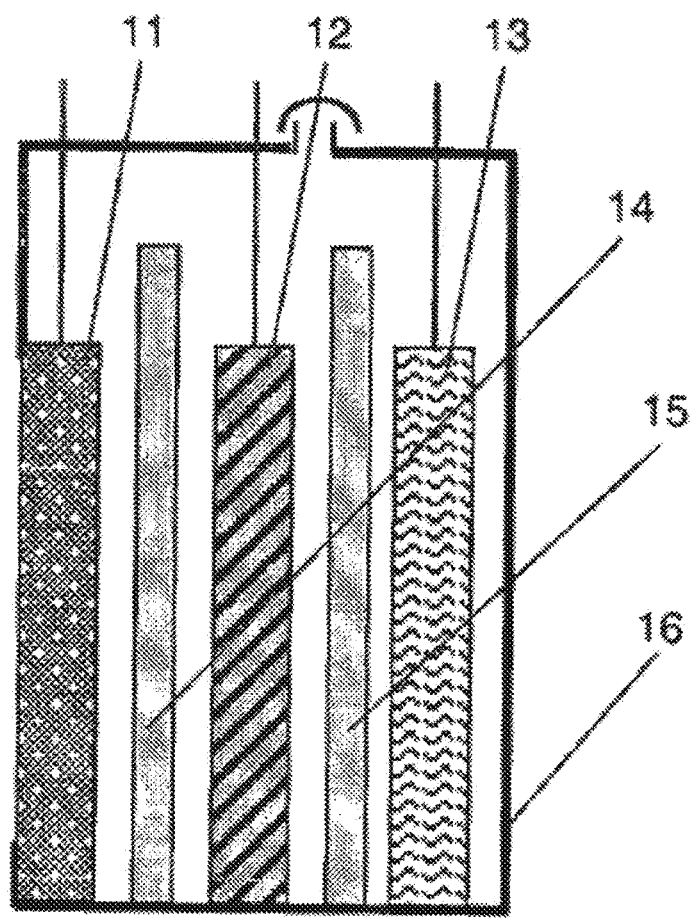

SEPARATOR FOR BATTERIES

CROSS-REFERENCE TO RELATED APPLICATIONS

This application is a continuation of U.S. Ser. No. 15/122,800 filed Aug. 31, 2016, which was a national stage application, filed under 35 U.S.C. § 371, of International Patent Application No. PCT/IB2015/051471 filed Feb. 27, 2015, which claims priority to provisional application No. 61/947,327 filed Mar. 3, 2014. Each of the previously noted applications is hereby incorporated by reference in their entirety.

FIELD OF THE INVENTION

The present application relates to separators for use in zinc secondary alkaline batteries and method for manufacturing the same. Moreover the present invention relates to separators permeable to hydroxide ion, for use in an electrically rechargeable electrochemical cell with Zinc electrode and alkaline electrolyte, and a battery comprising said separator.

BACKGROUND OF THE INVENTION

It is well known that during the electrical charging of a zinc anode alkaline battery, zinc dendrites are formed, leading to the perforation of the separator that lays between the zinc anode and the charging electrode compartments, and therefore to a short-circuit, rendering the battery completely useless.

The typical solution is to use a rayon type or polymeric porous separator (e.g. anionic exchange membrane, polymeric film made by zirconia/polysulfone, polymeric films, cellulose films, etc.). Other typical solutions of separators are described in the paper "Battery Separators" from Pankaj Arora and Zhengming (John) Zhang published in Chemical Reviews, 2004, Vol. 104, No. 10, pages 4419-4462, herein incorporated by reference in its entirety.

However these separators are not totally satisfactory because they are too permeable to zincate ions and zinc dendrites are still formed and usually perforate the separator in less than 50 cycles.

One aim of the present patent application is to provide a solution to improve the characteristics of such separators and extend their service life.

Another aim of the invention is to provide a separator that can greatly enhance its ability to prevent dendrites perforation.

The invention relates to a separator which is permeable to hydroxide ion, for use in an electrically rechargeable electrochemical cell with alkaline electrolyte between a Zinc electrode and a counter electrode, wherein:

said separator containing at least one Dendrite Stopping Substance or DSS, said DSS being a metal-containing compound such as oxide, hydroxide, salt, etc . . . , said metal chosen from the metals of the group consisting of Pt, Pd, Ni, Fe and Mn, and said DSS being in a form of particles.

The inventor noticed that incorporating some "Dendrite Stopping Substance" (DSS) particles in the separator's material or pores reduces dendrite formation.

In the invention "particle" means an aggregate of material whose size is below 500 µm.

The separator of the invention is such that during charging, i.e. when hydroxide ions are flowing from the zinc electrode towards the counter electrode, the dendrites growing from the Zinc electrode towards the counter electrode are stopped in their progression through the separator when they encounter DSS particles of the said separator.

Separators according to the invention can be prepared by including DSS particles within the material of the separator when it is formed. In other words, the DSS particles are added to the commonly used materials that are used to prepare separators.

Separators according to the invention can also be prepared by impregnating, with DSS particles, porous or fibrous typical material that are used to form separators. Classical alkaline-stable separators (known in the art) are for instance made of Polypropylene (PP)/Polyvinyl chloride (PVC), or Polytetrafluoroethylene (PTFE) or mixtures thereof. An alkaline-stable microporous separator according to the invention can be a microporous PVC separator for use in lead-acid batteries having a 45% to 70% volumetric porosity, a 0.05 µm to 10 µm pore size and a 0.1 to 1 mm thickness. The above-mentioned separator that contains the DSS particles can be obtained, for example, by soaking a classical separator with a DSS precursor, which results in DSS particles precipitation.

In an advantageous embodiment, the invention relates to the separator mentioned above, wherein said DSS is $Ni(OH)_2$ or one of its precursors, such as $NiCO_3$ or $NiSO_4$. In another embodiment, the invention relates to the separator mentioned above, wherein the size of the DSS particles is below 250 µm whereby minimizing the cost of the DSS material. It is to be noticed that larger particles would use more material and be more expensive for achieving the same effect.

In another advantageous embodiment, the invention relates to the separator mentioned above, wherein the thickness of the separator is ranging from 50 to 1000 µm whereby the dendrite stopping effect remains. A thicker separator would increase internal resistivity, would use more material and would be more expensive, while a thinner separator would have less effect to stop dendrites.

The invention also relates to an electrically rechargeable battery, with strong alkaline electrolyte, comprising at least one separator according to the invention, as mentioned above, said separator being placed between a Zinc electrode and a counter electrode.

In the invention a "strong alkaline electrolyte" means an electrolyte having a pH of at least 12.

In some embodiments the above mentioned battery comprises, as a cathode, an air electrode.

Moreover, in some embodiments the above mentioned battery comprises, as cathode, a nickel-oxide or a silver electrode.

The present invention provides separators that are comparatively more resistant to dendrites perforation and provides battery with longer service life than the one not comprising DSS particles.

This invention is advantageously suitable for zinc-nickel, zinc-silver, zinc-air, lithium-air electrically rechargeable batteries, especially for their use in stationery applications or electric vehicles such as e-cars, e-autobuses, e-trucks, e-bicycles, etc. Thus, the invention also relates to an electric or hybrid vehicle comprising at least one electrically rechargeable battery as mentioned above.

Another aspect of the invention relates to a method for preparing a separator as defined above, comprising:

a step of soaking a porous or fibrous material with a DSS precursor, such as $NiCO_3$ or $NiSO_4$ and a step of having DSS particles precipitate within the said material.

According to this process, separator commonly used for batteries is soaked into a DSS precursor. The DSS material then precipitates onto the cavities or the pores of the porous or fibrous material, conferring to the resulting material Dendrite Stopping properties.

Another aspect of the invention relates to a method for manufacturing a separator having Dendrite Stopping properties as defined above, comprising a step of adding DSS particles into the mixture of material used to prepare a separator This process allows to manufacture a separator that directly contains DSS particles, and exhibits Dendrite Stopping properties.

When preparing such a separator, it is ready to use and does not need to be soaked with a DSS precursor.

The invention also relates to the use of a separator as mentioned above, for manufacturing an electric battery. The invention will be further understood from the following detailed description of specific embodiments. The product and method of the invention are illustrated but not limited to the following examples.

LEGEND TO THE FIGURE

FIG. 1 shows a cross section view of a zinc-air battery cell with second reversible electrode and without auxiliary electrode, where (11) is an air electrode; (12) is a first reversible zinc electrode; (13) is a second reversible nickel-oxide electrode; (14) (15) are separators placed in between the neighboring electrodes; (16) is the casing of the battery.

EXAMPLES

Example 1

In this first example the inventors prepare a separator according to the invention by:
- adding 7 g of 50-100 μm $Ni(OH)_2$ particles to 100 ml ethanol $C_2H_5OH$ and mixing with a magnetic stirrer 20 min.
- then 3.3 ml of PTFE suspension (DuPont™ Teflon® PTFE TE-3893 with particle size 0.05 to 0.5 μm, solid content 60%, density 1.5 g/cc) is added to the mixture and further mixed for 2 h.
- then the mixture is left to rest and decant.
- then the decanted solid mass is well kneaded and rolled 12 times to obtain separator layers of thickness down to 0.2 mm.
- finally, these separator layers are dried 48 h at 30° C. during which time the thickness of the separator increases from 0.2 mm up to 0.25 to 0.3 mm.

The separator obtained has a very good dendrite stopping effect.

It is to be noted that by using $Ni(OH)_2$ particles smaller than 50 μm thinner layers can be rolled, thus permitting to obtain a separator final thickness of only 0.1 to 0.15 mm.

Example 2

In this second example to prepare a separator according to the invention, the inventors use a microporous PVC separator having a thickness of 1.1 mm for use in lead-acid batteries manufactured by Microtex Energy P Ltd., Bengaluru-560058, Karnataka, India. This material is first soaked during 1 hour with a 200 g/l $NiSO_4$ solution (nickel sulfate $NiSO_4$ is very soluble in water), then impregnated during 1 hour by strong alkaline solution, 100 g/l KOH, resulting in a precipitation of $Ni(OH)_2$ particles within the pores of the microporous separator. It is to be noted that Ni(NO3)2 and NiCl2 could be used instead of $NiSO_4$ as DSS precursor, while NaOH, $Na_2CO_3$ or K2CO3 could be swapped for KOH. Also the concentrations of both the DSS precursor and alkaline electrolyte can vary in a range of 35% to 300%.

Then the separator is well rinsed in water and dried, the excess of $Ni(OH)_2$ being removed from the separator's surface mechanically.

As a result, the in-pore $Ni(OH)_2$ particles could occupy from 5 to 50% of pore volume with various particle-size distribution.

$Ni(OH)_2$ particles are 5 to 10 weight percent from the final separator's weight.

Such prepared separator possesses enhanced counter-dendrites properties.

Example 3

In this third example one cell zinc-air battery is prepared including:
1—a Zinc anode, an Air-Electrode and an auxiliary electrode as described in FIG. 2 of WO2013/110097. Briefly, the battery cell contains the components described below with an additional indifferent auxiliary electrode made of fine nickel mesh (such as 6 Tyler mesh), it could also be an Ni-coated iron grid, electrically connected to the nickel-oxide electrode during cell charge.

A battery cell is prepared, and as shown in FIG. 1 contains the following components:
- an air electrode (11) produced by the company MEET (Korea, www.mee-t.com);
- a zinc electrode (12), having Ca 5 mm thickness and 5.5 Ah nominal capacity, prepared for example as described in PCT Application PCT/AM2010/000001;
- a nickel-oxide electrode (13) possessing 1.1 Ah nominal capacity such as one from NKBN 11 D Ni—Cd accumulator of Lugansk accumulator production plant; all these electrodes having the same visible surface area of 40×80 $mm^2$;

2—a porous separator (14) and (15) according to the invention (with DSS) used to wrap the Zinc electrode. The zinc anode, the separator, the counter electrode and the air-electrode are bathing, immersed in a strong 6M KOH electrolyte.

This battery setup is submitted to cycles of 8 hours 20 $mA/cm^2$ charging and 6 hours discharging at 25 $mA/cm^2$.

At first, a battery comprising the separator as described in Example 2 is carried out and no dendrite is piercing it after 50 cycles.

Secondly, a battery comprising the separator used is the initial PVC microporous separator of example 2, but without the preparation according to this invention (i.e. without DSS) is carried out. When used without DSS this separator is pierced by dendrites after less than 5 cycles at the same charge-discharge conditions. This example shows that the separator of Example 2 possesses enhanced counter-dendrites properties.

Specific embodiments of the invention have been described by the way of exemplary teachings however the scope of the present invention is not limited to the specific details and the illustrative examples shown and described. It will be apparent to persons skilled in the art that modifications and variations can be made without departing from the scope of the invention.

The invention claimed is:

1. A separator which is permeable to hydroxide ion, for use in an electrically rechargeable electrochemical cell with alkaline electrolyte between a Zinc electrode and a counter electrode, wherein:

said separator consisting in a porous or fibrous material defining cavities or pores, wherein said cavities or pores containing within at least one Dendrite Stopping Substance or DSS, the said DSS occupying from 5 to 50% of the volume of said cavities or pores, said DSS being a metal-containing compound, said metal chosen from the metals of the group consisting of Pt, Pd, Ni, Fe and Mn metal, and, said DSS being in a form of particles and being disposed solely within said cavities or pores.

2. The separator according to claim 1 wherein said DSS is $Ni(OH)_2$ or one of its precursors.

3. The separator according to claim 2, wherein said one of the precursors of $Ni(OH)_2$ is $NiCO_3$ or $NiSO_4$.

4. The separator according to claim 1, wherein the size of the DSS particles is a positive value below 250 μm.

5. The separator according to claim 1, wherein the thickness of the separator is from 50 to 1000 μm.

6. An electrically rechargeable battery, with strong alkaline electrolyte, comprising at least one separator according to claim 1, said separator being placed between a Zinc electrode and a counter electrode.

7. The electrically rechargeable battery according to claim 6 comprising an air electrode as a cathode.

8. The electrically rechargeable battery according to claim 6, comprising a nickel-oxide or silver electrode as a cathode.

9. An electric or hybrid vehicle comprising at least one electrically rechargeable battery as defined in claim 6.

* * * * *